2,841,472

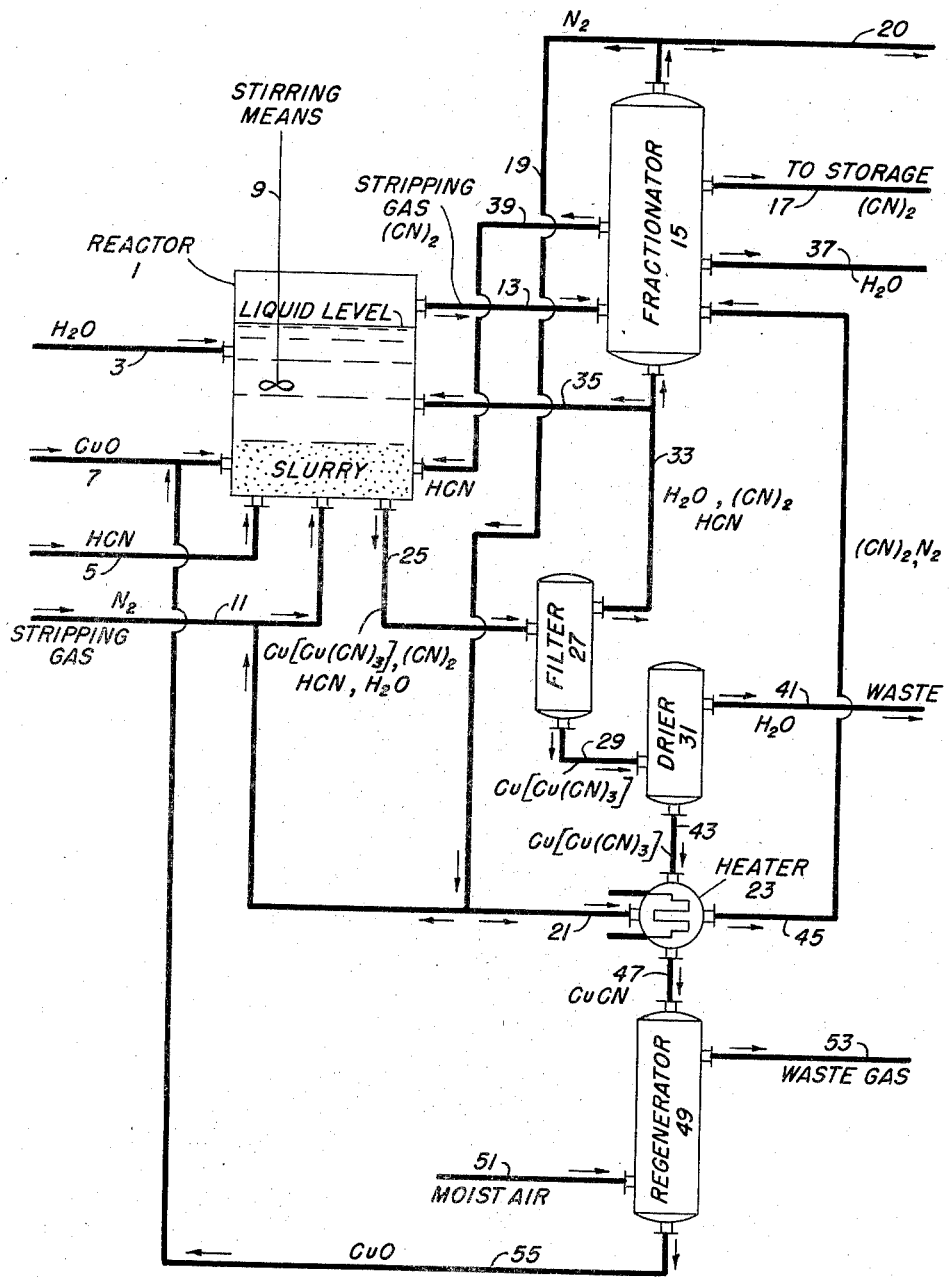

PREPARATION OF CYANOGEN

William L. Fierce, Algonquin, and Allen F. Millikan, Crystal Lake, Ill., assignors to The Pure Oil Company, Chicago, Ill., a corporation of Ohio Application November 4, 1955, Serial No. 545,055

14 Claims. (Cl. 23—151)

This invention relates to the preparation of cyanogen. More particularly, this invention relates to a process for the conversion in an aqueous environment of a cyanide ion-releasing reagent into cyanogen by reaction with a cupric ion-releasing reagent.

Cyanogen, also known as ethane dinitrile, dicyanogen and oxalonitrile, is a colorless and extremely physiologically toxic gas of high stability which is used in a number of chemical syntheses and other types of chemical reactions, notably in the preparation of various nitriles. Cyanogen was first prepared by Gay-Lussac in 1815 but has not heretofore been manufactured on a large scale and has not found wide usage commercially despite its valuable properties, such as its fungicidal nature, partly because the methods for its preparation are relatively expensive and time consuming.

Cyanogen has been prepared in the past by dehydration of ammonium oxalate or oxamide with phosphorous pentoxide; by the treatment of sodium or potassium cyanide with copper sulfate; by heating mercuric cyanide, silver cyanide or auric cyanide; and by the dehydration of glyoxime with acetic acid. A newer method of preparing cyanogen comprises reacting hydrogen cyanide with chlorine gas, with the evolution of hydrogen chloride and cyanogen. Elevated temperatures of about 200–1000° C. are necessary for this reaction. The production of cyanogen by oxidation of hydrogen cyanide with manganese dioxide at 200° C. and above has also been reported. The prior art methods above-described are characterized by requiring complex reagents and/or involving special operating conditions of temperature and/or pressure. Where strong oxidizing agents are used, such as manganese dioxide, potassium permanganate, chlorine and the like, undesirable by-products are often formed. Thus, for example, oxidation of hydrogen cyanide with potassium permanganate causes the reduction of permanganate and formation of manganous ions in the reaction solution, and these manganous ions must be removed if the process is to be continuous. The problem of such removal engenders time-consuming and expensive steps. Often, in the case of other similar oxidizing agents, the removal is not only time consuming but very difficult to perform. Moreover, yields of cyanogen obtained from hydrogen cyanide or hydrocyanic acid by prior art methods are, in general, quite low. Another drawback in the use of the common oxidizing agents is that the oxidizing agent is destroyed in the reaction and may not be regenerated in a simple manner.

An object of this invention is to provide a simple recycling process whereby cyanogen may be economically prepared from a cyanide ion-releasing agent.

A further object is to prepare cyanogen from hydrogen cyanide or other cyanide ion-releasing reagent through the use of a readily available reagent which is reconstituted or converted to an equally effective reagent during the process.

A still further object is to prepare cyanogen from hydrogen cyanide or other cyanide ion-releasing reagent by reaction with a cupric ion-containing reagent with subsequent regeneration to a cupric ion-containing reagent.

Yet another object is to provide a simple and efficient method of preparing cyanogen in high yields without the use of elevated pressures and with the recovery of additional cyanogen during the regeneration of the treating agent.

Still another object of this invention is to react hydrogen cyanide or other cyanide ion-releasing agent in aqueous solution at ambient temperatures and pressures with a cupric ion-containing reagent to form cyanogen and a cupric complex from which additional cyanogen may be obtained during reconstitution of the complex to a cupric ion-releasing reagent.

Yet another object of this invention is to react hydrocyanic acid and a cupric compound so as to form cyanogen without substantial net loss of a cupric reagent.

We have found that when hydrocyanic acid or another selected cyanide ion-releasing agent is reacted with a cupric ion-releasing reagent so that a copper complex is formed which may be broken down to the cupric ion-releasing agent and cyanogen on suitable treatment, high yields of cyanogen are obtained without the substantial production of interfering or otherwise deleterious by-products. A copper cyanide complex is formed during the reaction and may be removed continuously or intermittently and upon proper heating made to yield, as stated above, additional cyanogen and a cupric ion-releasing reactant, so that the process may continue by recycling the latter. The product produced by the heating may be oxidized to cupric oxide, used without substantial loss and for further contacting. The process is simple to carry out and involves no large expenditures of heat and/or increased pressure. The reactions which occur are set forth below, utilizing cupric oxide as the initial cupric-containing reagent.

(1)

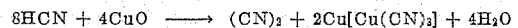

$$8HCN + 4CuO \longrightarrow (CN)_2 + 2Cu[Cu(CN)_3] + 4H_2O$$

(2)

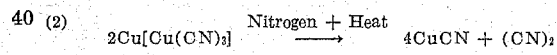

$$2Cu[Cu(CN)_3] \xrightarrow{\text{Nitrogen + Heat}} 4CuCN + (CN)_2$$

(3)

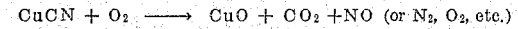

$$CuCN + O_2 \longrightarrow CuO + CO_2 + NO \text{ (or } N_2, O_2, \text{ etc.)}$$

The second reaction above should be carried out in the absence of oxygen in order to prevent oxidation of cyanogen to carbon dioxide and nitric oxide or other nitrogen compounds.

A particular part of novelty in our process lies in the treatment of the copper complex by heating to decomposition to yield cyanogen and by further heating to form cupric oxide, which may be recycled.

In order to more clearly point out our invention and facilitate an understanding thereof, reference is now made to the accompanying drawing which is a schematic representation or flow diagram illustrating a recycling process for the production of cyanogen according to our invention as set forth, where cupric oxide and hydrogen cyanide are the particular reactants used.

Into reactor 1 is fed water through line 3, hydrogen cyanide gas through line 5 and cupric oxide through line 7. If hydrocyanic acid of any suitable concentration in water is desired to be delivered to reactor 1 rather than hydrogen cyanide, it may be passed through line 5 or another line into reactor 1. Hydrogen cyanide may be delivered to reactor 1 at any suitable rate as may also water and cupric oxide.

The hydrogen cyanide may be in a pure, substantially pure, or relatively impure form or may be present dissolved in water in any desired concentration up to the limit of solubility of the gas in water at the particular temperature and pressure. The hydrogen cyanide or other cyanide ion-releasing reagent may be introduced at any desired rate and any desired ratio to the cupric ion-releasing compound. Thus, for example, a rate of 10–1000 ccs. of hydrogen cyanide/minute may enter the reactor per gram of cupric oxide. The total amount of HCN or other cyanide ion-releasing reagent charged depends mainly on the amount of the particular cupric ion-releasing reagent present and is preferably the stoichiometric amount required to react with the cupric ions. In view of reaction 1 set forth above, a mole ratio of hydrogen cyanide to cupric oxide of about 2:1 is preferred. However, since any excess HCN is recycled, amounts greater than stoichiometric can be charged.

Other cyanide ion-releasing reagents may be used which by reaction with the cupric ion-releasing reagent yield cyanogen, plus a copper complex, preferably in a water-insoluble form. The copper complex must be such as to be readily decomposable, on isolation and separation from the reaction solution, to additional cyanogen and a product which can easily be converted to cupric oxide. Care must be exercised to avoid using combinations of cyanide ion and cupric ion compounds where the cyanide ion compound is essentially water insoluble, since the reaction may proceed slowly or not at all once cupric oxide, difficultly soluble in water, is also present (initially or after regeneration). We prefer to use cupric oxide initially because the regeneration thereof is simple, and because fewer interfering ions are present in the initial reaction solution. Suitable cyanide ion-releasing reagents for use in our process, which meet the criteria set forth above, are the alkali metal cyanides, barium cyanide, calcium cyanide and ammonium cyanide. These may be reacted with any of the following cupric ion-releasing reagents in aqueous solution to form the desired water-soluble or water-insoluble copper complexes: cupric halides, cupric sulfide, cupric sulfate, etc. For example, if cupric chloride is reacted in aqueous solution with sodium cyanide, cyanogen and a copper complex are formed.

This complex is subjected first to proper heating at over about 100° C. in the absence of oxygen to release cyanogen. The residue compound is then heated in the presence of oxygen at above about 200° C. to form cupric oxide which may then be recycled. In each case, by our process, cyanogen is obtained by heating the complex in the absence of oxygen, and cupric oxide is obtained on further heating the complex or residue from the initial heating step to above about 200° C.

The reactants are continuously agitated together to form an aqueous slurry with hydrogen cyanide dissolved therein by means of stirrer 9.

Nitrogen or other gas inert to the reactants, such as air, is added to the system through line 11 and bubbles up through the reactor in order to facilitate agitation of the solution and mixing of the ingredients and also to strip out cyanogen formed in the process. The reactor is maintained at any suitable temperature such that the ingredients are in liquid phase. The reaction proceeds satisfactorily at ambient temperature although temperatures as low as 0° F. and as high as 150° F. are satisfactory. No increased or decreased pressure is needed to bring about the reaction although the reaction can be carried out at sub- or super-atmospheric pressure. Evolved gases, principally cyanogen formed by the reaction and the stripping gas, nitrogen, added to the reactor, pass out of the reactor through line 13 into fractionator 15 where cyanogen is separated by a suitable fractionator procedure involving distillation and low temperature condensation from nitrogen and other constituents being processed in the fractionator. The cyanogen passes from fractionator 15 to storage through line 17. Nitrogen passes out through line 19 and back into line 11; or is exhausted through line 20; or passes into line 21 for use in heater 23 as hereinafter described; or is split among the three lines. If oxygen is used as the stripping gas, it is not passed to heating chamber 23. The cupric oxide in reactor 1 gradually becomes inactivated by the formation with hydrocyanic acid of an insoluble compound termed herein a complex and of the formula:

$$CU^{++}[CU(CN)_3]^{--}$$

This complex is removed from reactor 1 through line 25, together with water containing dissolved hydrogen cyanide and cyanogen. The removal of the complex may occur continuously or intermittently and the aqueous slurry is passed through line 25 to filter 27 where the complex is separated from the aqueous solution and is passed thence through line 29 into drier 31.

Where the copper- and cyanide-containing complex is other than that formed by reaction of hydrogen cyanide and cupric oxide in aqueous solution and is water soluble, it may be treated by first removing a portion of the reaction solution, distilling off the water and other constituents except the complex and drying the complex, then suitably heating it to decompose it and release cyanogen, then further heating and oxidizing it to obtain cupric oxide thereby.

The aqueous solution containing dissolved hydrogen cyanide, cyanogen and water is passed from filter 27 through line 33 into fractionator 15. Line 35 is provided in the event that it is desired to pass all or a portion of the aqueous solution back to the reactor without separation of the dissolved hydrogen cyanide and cyanogen therefrom. On passage of the aqueous solution to fractionator 15, cyanogen is separated and withdrawn through line 17, water is withdrawn through line 37 and hydrogen cyanide is recycled to the reactor through line 39.

In drier 31 air, warmed to a relatively low temperature, such as 100° F., or other drying means may be passed through the complex at a fast rate to remove water vapor which passes out from the drier through line 41 in the air as exhaust. The dried complex is then passed from the drier through line 43 into heating chamber 23 where it is heated by any suitable means such as heating coils in a nitrogen or other inert atmosphere (non-oxidizing) supplied from line 21 or from an outside source. The complex is heated to about 100–200° C. and broken down to copper cyanide and cyanogen. Cyanogen and other gases pass from the heater through line 45 into fractionator 15.

The hot solids obtained from heater 23, mainly cuprous cyanide, are then passed through line 47 into regenerator 49 where they are further heated to at least about 200° C., with moist air introduced through line 51. The solids undergo oxidation from cuprous cyanide into cupric oxide. Renewed CuO passes from regenerator 49 through line 55 and may be returned to reactor 1 through line 7.

The above system provides for the reaction of an aqueous solution of hydrogen cyanide with cupric oxide with the formation of water-insoluble copper complex and cyanogen, the decomposition of the copper complex to copper cyanide and cyanogen, and the conversion of the copper cyanide to cupric oxide, which may be re-utilized in the reactor. Equivalent systems have been set forth above, utilizing other selected reactants. Thus, cupric oxide is not lost in the process as it continues to operate but is regenerated and re-utilized. Only the hydrogen cyanide is consumed by transformation to cyanogen, which is recovered both from the primary reaction between hydrogen cyanide in water solution and cupric oxide, and from the decomposition of the copper cyanide complex. Even the nitrogen may be recycled for reuse as the process continues.

This process may be run on a batch basis, or on a continuous basis. In the event the process is run continuously, aqueous cupric oxide slurry or additional cupric salts and aqueous or dry HCN are continuously charged to the reactor so as to maintain the desired concentrations of reactants in the reaction solution, and the slurry is continuously or intermittently removed from the reactor in order to maintain a substantially constant level therein.

Reactor 1 may be any suitable vessel, such as a glass lined or steel reactor operating under ambient temperatures and pressures. Filter 27 may be any conventional type of filtering means or a centrifuge, etc. Drier 31 may be any conventional type of drier, such as an enclosed steel vessel containing a coil heating unit, or a unit for rapidly circulating warmed air over the complex, while heater 23 may be of any suitable nature, such as a closed steel vessel heated with copper coils through which a suitable heat transfer medium circulates. The design of fractionator 15 depends on the mode of fractionation employed to separate cyanogen from the constituents present. As indicated above, the fractionator may, for example, contain a fractional distillation zone at the bottom with refrigeration coils near the top so as to obtain condensation, distillation and refluxing. Regenerator 49 again may be of any suitable nature, for example, a steel vessel of the type used in regeneration of moving bed catalysts. In all the above cases, conventional apparatus is suitable. Supplementary pumps, compressors, valves and other standard equipment as may be required in the operation of this process are also contemplated.

The following examples more clearly illustrate the scope and subject matter of this invention.

Example I

Hydrogen cyanide gas is passed at the rate of 30 cc. per minute into a slurry composed of 5.01 grams of cupric oxide powder suspended in 50 ml. of water. Nitrogen is introduced to the slurry at the rate of 50 cc. per minute. The slurry is contained in a round-bottom, glass flask with suitable outlets and inlets, and subjected to mechanical stirring during the entire reaction period. A total of 0.898 mol of hydrogen cyanide, that is, 24.2 grams of hydrogen cyanide, is charged to the system over a period of 11 hours. The hydrogen cyanide consumed is 0.165 mol and yields 0.019 mol of cyanogen, for a ratio of mols of hydrogen cyanide consumed to mols of cyanogen produced of about 8.7:1.

The gray solid in the aqueous slurry is removed from the reaction vessel after the reaction period is completed and subjected to filtration and then air drying. This gray solid comprises approximately 5.63 grams. A small amount of slurry is lost in removing it from the reaction vessel. The solid is heated to approximately 150° C. for 2 hrs. and 0.020 mol of additional $(CN)_2$ are produced. Moist air at the rate of about 50 cc./minute is then passed over 3.91 grams of the remaining material for a total of about 6⅔ hours as it is heated at 460° C. A black powder in an amount of 3.16 grams is obtained.

The regenerated cupric oxide comprising the black powder obtained in the above step is returned to the reaction vessel, and hydrogen cyanide gas at the rate of about 22 cc./minute is passed into the slurry of the regenerated catalyst suspended in 50 cc. of water. Nitrogen is passed through the slurry at the rate of 55 cc./minute. A total of 7.2 grams of hydrogen cyanide, that is 0.268 mol, is charged over a period of 4 hours. The mols of hydrogen cyanide consumed is 0.083 and yields 0.0114 mol of cyanogen for a ratio of hydrogen cyanide consumed to cyanogen formed of 7.3:1.

The above example indicates that cupric oxide when regenerated according to our process performs as satisfactorily as fresh cupric oxide in the formation of cyanogen by reaction with hydrogen cyanide in aqueous solution.

Example II

Approximately 50.5 grams of cupric oxide in powder form are added to 250 ml. of water in a round, glass reaction vessel to form an aqueous slurry. The slurry is stirred at room temperature and 20 ml. of liquid hydrocyanic acid is added, while oxygen is passed through the reaction solution to strip out cyanogen as it is formed. Effluent gases are recovered and analyzed. Samples after 15 minutes and 45 minutes of reaction time contain 6.52% and 5.20% cyanogen, respectively.

The water concentration in the reaction zone may widely vary, as for example 5–100 ml. of water per 1–100 gm. cupric oxide. Nitrogen or other stripping gas may pass through the slurry in the reactor at any suitable rate, such as 10–100 cc. per minute when 5–100 cc. per minute of hydrogen cyanide and 1–100 grams of cupric oxide are utilized. The reaction time may vary with the concentration of reactants and the rate of introduction of the reactants. Thus for a suitable batch operation, the total reaction time may be 1–20 hours.

Suitable modifications of apparatus and/or processing steps as are within the skill of one versed in the art are contemplated as being within the scope of our invention.

We claim and particularly point out as our invention:

1. In a process for the preparation of cyanogen in which a cupric ion-releasing reagent is contacted in aqueous medium in a reaction zone with a water-soluble, cyanide ion-releasing reagent to form cyanogen and copper complex decomposable to cyanogen and a solid product, the improvement which comprises decomposing said complex with heat in the absence of oxygen to release further amounts of cyanogen, and subsequently heating the solid residue in the presence of oxygen at a temperature sufficiently high to generate cupric oxide and utilizing said cupric oxide as cupric ion-releasing agent in the preparation of additional quantities of cyanogen.

2. The process of claim 1 in which the complex is maintained at above about 100° C., and the solid residue is maintained at at least about 200° C.

3. The process of claim 1 in which said cupric ion-releasing reagent is cupric oxide and said cyanide ion-releasing reagent is hydrocyanic acid.

4. The process of claim 1 in which said cupric ion-releasing reagent is cupric oxide and said cyanide ion-releasing reagent is an alkali metal cyanide.

5. The process for the preparation of cyanogen which comprises reacting a water-soluble, cyanide ion-releasing reagent in a reaction zone in aqueous medium with a cupric ion-releasing reagent, recovering cyanogen as effluent, removing at least a portion of the complex formed during said reaction from said reaction zone to a heating zone and subjecting said complex therein to above about 100° C. and less than about 200° C. in the absence of oxygen so as to recover cyanogen as effluent, passing the solid residue formed in said heating zone to a regeneration zone, heating said residue at at least about 200° C. in the presence of oxygen for a time sufficient to convert at least a portion of said residue to cupric oxide, and recycling cupric oxide-containing residue formed therein to said reaction zone for further contacting.

6. The process of claim 5 in which said cyanide ion-releasing reagent is hydrocyanic acid and said cupric ion-releasing reagent is cupric oxide.

7. The process of claim 5 in which said cyanide ion-releasing reagent is alkali metal cyanide and said cupric ion-releasing reagent is cupric oxide.

8. The process of claim 6 in which a gas inert to said reaction constituents is passed through said reaction zone as stripping gas for cyanogen, and said complex is heated in said heating zone under an inert gas blanket, and in which said reaction zone operates at ambient temperature and pressure.

9. The process of claim 7 in which a gas inert to said reaction constituents is passed through said reaction zone as stripping gas for cyanogen, and said complex is heated in said heating zone under an inert gas blanket, and in which said reaction zone operates at ambient temperature and pressure.

10. The process of claim 5 in which said complex after withdrawal from said reaction zone is separated from admixed reaction solution in a filter zone and then substantially dried in a drying zone before passage to said heating zone.

11. The process for the preparation of cyanogen which comprises contacting cupric oxide, hydrocyanic acid and water in a molar proportion of about 1:1–25:20–100 in a reaction zone while bubbling nitrogen up therethrough, recovering cyanogen as effluent, removing at least a portion of the tricyanocuprate complex formed during the reaction between hydrocyanic acid and cupric oxide as slurry to a filter zone and filtering reaction solution therefrom, substantially drying solid residue in a separate drying zone, heating said residue in a separate heating zone at above about 100° C. under a non-oxygen-containing nitrogen atmosphere for a time sufficient to at least partially decompose said complex and recovering cyanogen as effluent, subjecting solid residual material from said heating zone to additional heating in a regeneration zone to at least about 200° C. in the presence of oxygen for a time sufficient to convert at least a portion of said residue to cupric oxide and recycling said cupric oxide-containing residue to said reaction zone for recontacting.

12. The process of claim 11 in which said molar proportion is about 1:5–16:20–100 for cupric oxide, hydrocyanic acid and water, respectively, said complex is substantially completely decomposed by heating to release cyanogen and said residue in said regeneration zone is substantially completely converted to cupric oxide.

13. The continuous process for the preparation of cyanogen which comprises continuously contacting cupric oxide, hydrocyanic acid and water in a molar proportion of about 1:1–25:20–100 in a reaction zone, while continuously bubbling nitrogen therethrough, continuously recovering cyanogen as effluent, at least intermittently removing at least a portion of the tricyano cuprate complex formed during the reaction between hydrocyanic acid and cupric oxide as slurry to a filter zone and at least intermittently filtering reaction solution therefrom, at least intermittently drying solid residue therefrom in a separate drying zone, at least intermittently heating said residue in a separate heating zone at about 100° C. to 200° C. under a non-oxygen-containing atmosphere maintained therein and at least intermittently recovering cyanogen therefrom as effluent, at least intermittently subjecting solid residue from said heating zone to additional heating in a regeneration zone to at least about 200° C. in the presence of oxygen maintained therein and at least intermittently recycling the cupric oxide-containing treated residue from said regeneration zone to said reaction zone to maintain said cupric oxide molar proportion, while at least intermittently introducing make-up hydrocyanic acid and water to maintain said molar proportions in said reaction zone.

14. The proces of claim 13 in which said molar proportion is about 1:5–16:20–100 for cupric oxide, hydrocyanic acid and water, respectively, said complex is substantially completely decomposed by heating to release cyanogen and said residue in said regeneration zone is substantially completely converted to cupric oxide.

References Cited in the file of this patent
UNITED STATES PATENTS 1,352,176     Clancy _____ Sept. 7, 1920

OTHER REFERENCES

Williams: "Cyanogen Compounds," 2nd ed. (1948), Edward Arnold and Co., London; pp. 112–113.

Norberg et al.: Acta Chem. Scand. 3, 174–8 (1949), in English.

Dufau: Comptes Rendus Hebdomadaires des Seances l'Academie des Sciences (France) 36, 1099–1102 (1853).